Patented Feb. 2, 1943

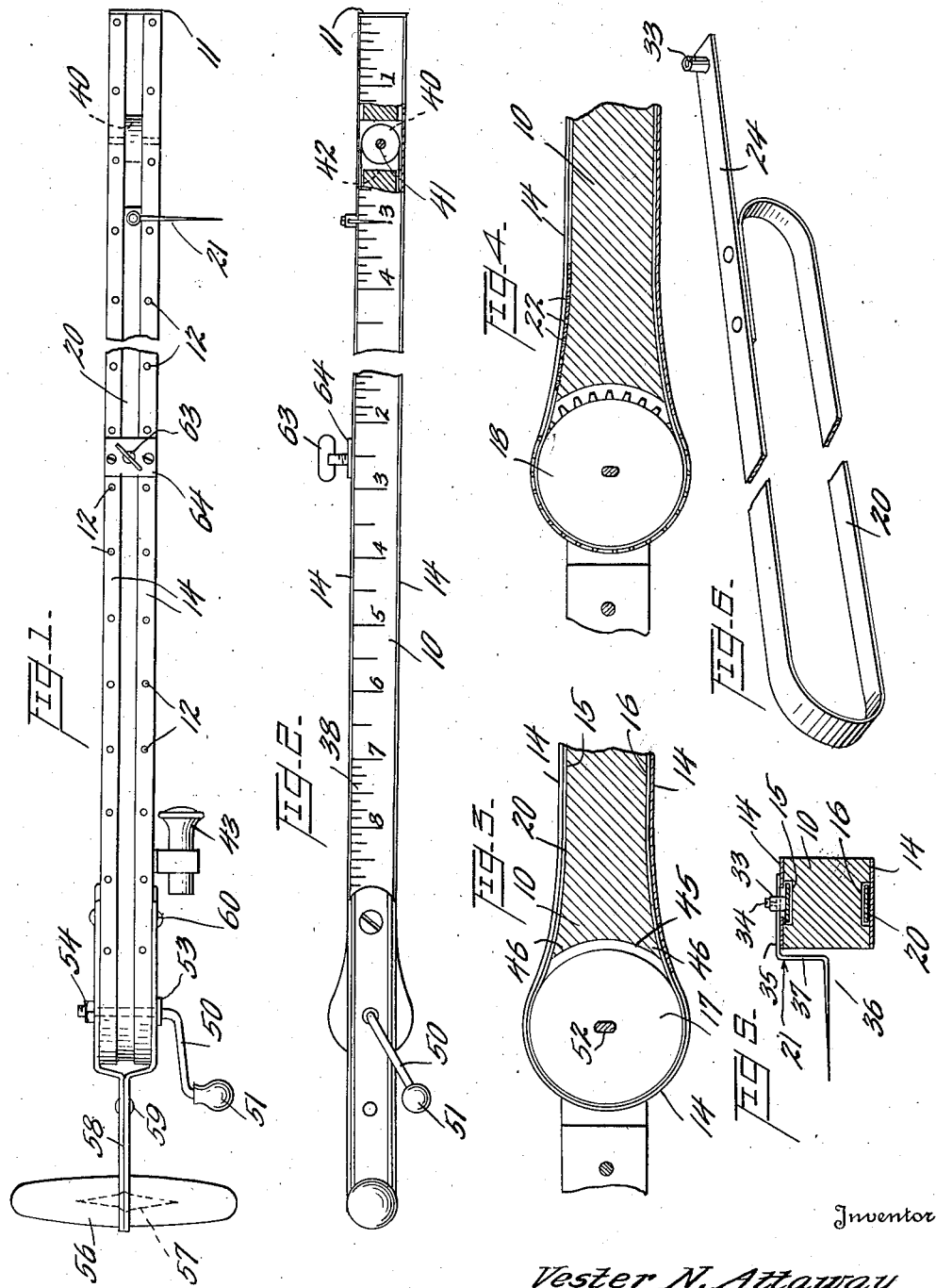

2,309,818

UNITED STATES PATENT OFFICE 2,309,818

GAUGE

Vester N. Attaway, Jackson, Tenn.

Application June 20, 1941, Serial No. 399,006

2 Claims. (Cl. 33—126.7)

This invention relates to mechanical gauge sticks and has for its principal object the provision of a simple and efficient gauge, particularly adapted to measuring the depth of light oils in storage tanks.

A further object of the invention is to lessen the cost of articles of this type. This is accomplished by utilizing for the longitudinal member of the gauge sticks a standard calibrated rod and adding to this rod four simple guides for holding in place a flexible band such as a readily obtainable steel tape which may carry on one end a gauge pin which upon touching the surface of the oil will create ripples whereupon the tape may be locked into position and the depth read upon withdrawing the rod from the storage tank. By having the gauge pin extend reasonably far from the rod the measuring of depth is greatly facilitated and all disadvantages of the float method avoided. Even on cloudy days it is easy to determine precisely when the pin touches the light oil as the contact causes circles or ripples which are easily perceptible.

In the past a usual method of obtaining the depth of gasoline and other light oils in storage tanks is to use a stick carrying a float but this means is quite inaccurate because the float frequently hangs and if the float is made too heavy it will cause the light oil to rise on the stick and give an inaccurate reading. An even more popular method is to use a stick painted black on one side. This method is subject to considerable inaccuracy because the gasoline spreads rapidly and creeps up on the rod a slight amount no matter how fast the stick is withdrawn.

It is the purpose of my invention to eliminate the disadvantages of the prior art sticks and to furnish a gauge stick which not only gives extremely accurate readings but which is sturdy and inexpensive.

In the drawing:

Figure 1 is a plan view.

Figure 2 is an elevation.

Figure 3 is a longitudinal section through the preferred form of driving wheel.

Figure 4 is a similar view but showing a pinion as the driving sprocket wheel.

Figure 5 is a cross-section illustrating the pin.

Figure 6 is a perspective showing the preferred form of steel tape.

The rod 10 is preferably of hard wood calibrated in feet and inches as illustrated and having at its bottom end a brass plate 11 of well known form. To the top and bottom faces of this rod I apply, as for example by the brads 12, steel guiding strips 14 running substantially the entire length of the rod and somewhat overlying the parallel grooves 15 and 16 cut respectively into the top and bottom faces of the calibrated rod. The flexible band 20 which is preferably of steel tape slightly narrower than the width of the slots 15 and 16 confined in the slots of the rod by means of the four guides 14 and carries approximate one end a gauge pin 21. The wheel 17 for moving the steel tape may be smooth as in Figure 3 or may be a sprocket wheel as at 18 in Figure 4, in which case the steel tape would be perforated as at 22 to fit this sprocket wheel. It is my preference, however, to use the smooth wheel and to form the band 20 into a closed loop as at 24, the latter carrying the pin 21. With the sprocket form, however, the band preferably is not closed, one end of the band always being in the top slot 15 while the other end of the band moves in the lower slot 16.

The gauge pin 21 may be secured to the band 20 through a stud 33 having a lock screw 34 to hold the pin in adjusted position. The pin has two end portions, 35 and 36, parallel with each other and joined by a mid portion 37 at right angles to both. The portion 37 lies closely adjacent the calibrations 38 while the free end 36 is long, slender and preferably is carried to a reasonably fine point. The auxiliary wheel 40 is used only when the tape is smooth and is preferably located near the bottom end of the rod and is of such diameter as to permit the free end 20 of the band sliding easily over it. The axle 41 of this wheel 40 may be fast to either the rod or the auxiliary wheel as may be desired, but I prefer that the wheel shall turn in its slot 42 upon the axle.

At the handle end the calibrated rod is slotted back to the point 45 to receive a wheel 17 or 18 as the case may be. It is convenient to build up the rod at top and bottom by wood fillets 46 which permit carrying the guide strips 14 completely around the handle end of the rod. The crank 50 carries a small wooden handle 51 and is flattened as indicated at 52 between its collar 53 and the retaining nut 54, thus providing a non-circular engagement with the steel tape driving wheel.

The handle is preferably composed of two halves 56 secured as by the screws 57 to steel plates 58 riveted together as at 59 just short of the rod and by a screw or rivet 60 appreciably beyond the crank 50.

In operation the gauge stick is lowered into the tank until the brass plate 11 rests upon the bottom of the tank. The small handle 51 is now moved until the gauge pin 21 touches the still surface of the oil and causes ripples. At this time the steel tape 20 is locked to the rod in any desirable manner, here shown as a locking screw 63 carried by a brass plate 64 secured to the top of the rop above the steel guides 14. While the locking device could readily be automatic I prefer the simple form shown as it gives a very satisfactory reading and avoids the use of a spring which would otherwise be necessary to clamp the tape to the rod upon release of the spring. In each of the forms of the invention the gauge pin 21 may travel to a point closely adjacent the brass plate and when the perforated type of tape is used the length is such that it slightly more than clears the toothed wheel 18 when the gauge pin is at its lowest reading.

The pointed end 36 of the gauge pin 21 may be in the path of the beams of a flash light 43 fastened on the top of the stick and is coated with a luminous compound so that it is readily visible in a dark tank, in which case the flash light is not needed. This is particularly advantageous as it enables the operator to determine at a glance whether the pin is above the liquid or beneath it, for the luminous coating is not visible if the pin is immersed.

What I claim is:

1. A gauge for determining the depth of a liquid in a tank, comprising a calibrated rod, parallel guides along one face of the rod, an endless band confined by said guides and having a tangent extension, a pair of wheels mounted within the rod for moving the band, means carried by the guides for anchoring the band to the rod, and means carried by said extension of the endless band for engaging the surface of the liquid.

2. A gauge for measuring the depths of liquids, comprising a calibrated rod, a flexible band, one end of which is secured to an intermediate portion of the band to form an endless loop with a tangent extension, guides secured to the rod to hold the flexible band in contact with the rod, a pin carried by the tangent extension of the band, said pin extending across the calibrations and then laterally away from the rod, and means engaging the band to move the pin longitudinally of the rod.

VESTER N. ATTAWAY.